United States Patent
Schuster et al.

(10) Patent No.: US 6,674,745 B1
(45) Date of Patent: Jan. 6, 2004

(54) METHOD AND SYSTEM FOR MAPPING PHONE NUMBERS TO IP ADDRESSES

(75) Inventors: Guido M. Schuster, Des Plaines, IL (US); Ikhlaq S. Sidhu, Vernon Hills, IL (US); Jerry Mahler, Prospect Heights, IL (US); Jacek A. Grabiec, Chicago, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/223,856

(22) Filed: Dec. 31, 1998

(65) Prior Publication Data (65)

(51) Int. Cl.$^7$ ............................................. H04L 12/66
(52) U.S. Cl. ..................... 370/352; 370/401; 370/466
(58) Field of Search ........................ 370/401, 352, 370/353, 354, 466; 709/203

(56) References Cited

U.S. PATENT DOCUMENTS 6,088,725 A * 7/2000 Kondo et al. ............... 709/220

OTHER PUBLICATIONS

"ITU–T Recommendation H.323", Packet Based Multimedia Communications Systems, International Telecommunication Union (1998).

"International Engineering Consortium", Trillium H.323 Tutorial, http://www.webproforum.com/trillium/index.html (Sep., 1998).

* cited by examiner

Primary Examiner—Kenneth Vanderpuye
(74) Attorney, Agent, or Firm—McDonnell Boehnen Hulbert & Berghoff

(57) ABSTRACT

A system for automatically populating an IP telephony address mapper with mapping information for an IP telephony gateway or other device. A self-registering gateway is configured to automatically provide an address mapper with mapping indicia defining the IP address of the gateway and the telephone numbers served by the gateway. In one embodiment, for instance, the gateway places a PSTN modem-to-modem call to the address mapper and conveys its IP address as a modulated data stream, while the address mapper may determine the telephone number of the gateway through established automatic calling number delivery procedures. Based on the telephone number of the gateway, the address mapper may then refer to a telephone number mapping database to identify other telephone numbers that could be served by the gateway. The address mapper may then update its address mapping data files accordingly.

34 Claims, 4 Drawing Sheets

METHOD AND SYSTEM FOR MAPPING PHONE NUMBERS TO IP ADDRESSES

BACKGROUND OF THE INVENTION

1. Field of the Invention

This invention relates generally to the field of telecommunications, and more particularly to methods by which telephone calls (either via a personal computer or conventional "black telephone" set) are placed between two parties over a packet switched computer network such as the internet. In accordance with one aspect of the invention, the method facilitates automated mapping of called party telephone numbers with the network addresses of IP telephony gateways that serve those numbers.

2. Description of the Related Art

This invention is related to the emerging technology presently known as internet telephony (sometimes referred to in the art as Voice over IP (VoIP) or IP Telephony, where IP stands for Internet Protocol) and the process by which digitized voice is treated as data and routed over a digital data network between the call's participants. The invention is particularly suitable for use in devices or systems that support the handling of IP telephony calls. An example of one such device is the IP telephony gateway or internet telephony gateway (ITG), which is where IP telephony calls are typically created and terminated on the network. Of course, the invention is also suitable for use in other devices or systems as well.

Internet telephony presents an attractive technology for use in long distance telephone calls, as compared to the public switched telephone network (PSTN), which has been the traditional transmission medium. The primary advantage is cost. In the United States, long distance service providers for the PSTN provide domestic services at rates ranging from roughly 10 to 30 cents per minute, and international rates for substantially more, depending on the time of day, day of the week, and the distances involved. In contrast, the cost of internet telephony anywhere in the world is potentially the cost of a local telephone call to the local internet telephony provider at one end and the cost of a local call from an internet telephony service provider at the far end to the destination telephone. Once the call is routed from the local internet telephony provider onto the internet, the transmission of the data from the local internet telephony provider to the far end internet telephony provider can be free for all practical purposes, regardless of where the two parties are located. The same holds true whether the call is sent over the internet or over a private data network.

Those skilled in the art are familiar with the typical configuration of an internet telephony system. In general, users at two or more telephone devices are set to engage in a conversation over an IP network. Each telephone device (and/or phone number) is typically served by an ITG, which is owned and operated by an internet telephony service provider (ITSP) and which provides connectivity to the network. To place an internet telephony call, a party contacts an ITG of his or her ITSP ("the originating ITG") and provides the telephone number of a called party. The originating ITG then sets up a call over the IP network with an ITG that serves the called party ("the terminating ITG"), and the terminating ITG then contacts the called party, thus completing the communications path between the calling and called parties. Once this path has been established, the parties may begin to engage in interactive telephone communication over the IP network.

This basic IP telephony, arrangement assumes that the originating ITG knows the IP network address of the terminating ITG that serves the called party and therefore knows where in the network to route calls placed to the called party telephone number. However, when a person places an IP telephony call, the person may typically supply the originating ITG with only the telephone number of the called party (and perhaps an authorization code), not the IP address of the terminating ITG that serves the called party. Therefore, in order to facilitate completion of the call, some mechanism must be in place to allow the originating ITG to determine the IP address of an appropriate terminating ITG based on the telephone number of the called party.

In existing IP telephony systems, this address mapping functionality is provided by an address mapping system (AMS). The AMS is typically positioned as at least one node on the IP network, and each ITG in the network can establish IP communication with the AMS. The AMS typically includes database server coupled with one or more address mapping databases. The to address mapping databases then include one or more tables of data that correlate telephone numbers with the IP addresses of ITGs serving those numbers. Thus, when an originating ITG receives a call request, the ITG may transmit a signaling message over the IP network to the AMS, asking the AMS to translate the dialed telephone number into an IP address of an ITG that can provide network connectivity for the called party. The AMS may then consult its address mapping database tables and return a response message to the querying ITG, indicating the IP address of a terminating ITG. The originating ITG may then set up the call with the terminating ITG.

The existence of a commercially useful address mapping system assumes in turn that the AMS will contain substantially current and correct mapping information for correlating telephone numbers with IP addresses. Therefore, some mechanism must be provided for populating the address mapping database(s) with this mapping information. One such mechanism is rote-force data entry, in which, for example, an operator sits at a computer workstation and enters countless records, one for each telephone number or group of telephone numbers in the network. Of course, this manual data entry process can be exceedingly time consuming and error prone. Further, as telephone numbers and IP addresses are added, removed or changed, the data records in the address mapping database(s) must be updated accordingly. Consequently, there exists a need for an improved mechanism of populating the AMS with address mapping information.

SUMMARY OF THE INVENTION

The present invention provides a method and system for automatically discovering and registering the IP addresses of IP telephony gateways and the corresponding phone numbers of subscribers served by those IP telephony gateways.

In accordance with one aspect of the invention, a self registering IP telephony gateway (SRITG) may be provided. The SRITG may include a microprocessor, a memory and a network interface unit and may be configured to automatically convey mapping indicia to an AMS in the network. This mapping indicia may include, for instance, (i) indicia of the IP address of the SRITG ("IP address indicia") and (ii) indicia of the phone numbers that the SRITG serves (i.e., "phone number indicia"). In one arrangement, for instance, the SRITG may be configured to automatically convey this information to the AMS when the SRITG is first installed and powered up, and/or in response to a change in its IP address or in the phone numbers that it serves.

In accordance with an aspect of the invention, the SRITG may convey its mapping indicia to the address mapping machine via an IP network transmission, via a conventional PSTN modem-to-modem connection, or via another suitable connection. Further, the SRITG may convey the mapping indicia to the AMS either directly (for instance, as a data or payload message delivered to the AMS) or indirectly (for instance, as an indicator that allows the AMS to derive the necessary information, for instance, based on readily available reference databases).

By way of example, the IP address indicia may literally be the IP address of the SRITG. Alternatively, the IP address indicia may be a domain name of the company that owns and/or operates the SRITG, and the AMS may translate that domain name into a numerical IP address of the SRITG by reference to a readily available Domain Naming System (DNS) server.

Also by way of example, the phone number indicia may literally be the phone numbers served by the SRITG. Alternatively, the phone number indicia may simply be the phone number of the SRITG itself, and the AMS may identify the phone numbers geographically closest to the SRITG phone number, and therefore likely served by the SRITG, by reference to a readily available geographic phone number mapping database. Further, according to another advantageous feature of the present invention, the SRITG may easily convey its own phone number to the AMS by placing a conventional PSTN call to the AMS and letting the AMS receive its phone number via standard calling number delivery ("caller ID") processes.

Still alternatively, the phone number indicia may be the specific geographic position of the SRITG, and the AMS may identify phone numbers geographically closest to that position, and therefore likely to be served by the SRITG, by reference to a readily available geographic phone number mapping database. In this regard, in accordance with another useful aspect of the present invention, the SRITG may determine its specific geographic coordinates through readily available Global Positioning System (GPS) information and may convey those coordinates to the AMS through any suitable connection.

The foregoing, as well as other useful advantages and features of the present invention, will become apparent to those of ordinary skill in the art by reading the following detailed description, with reference where appropriate to the accompanying drawings.

BRIEF DESCRIPTION OF THE DRAWINGS

A preferred embodiment of the present invention is described herein with reference to the drawings, in which.

DETAILED DESCRIPTION OF THE PREFERRED EMBODIMENT

The present invention provides an improved apparatus and method for establishing address mapping information in a network. For convenience of illustration, the invention will be described in the context of an IP telephony system and particularly in the context of establishing address mapping information for an IP telephony gateway (ITG) that serves (i.e., provides network connectivity for) a plurality of telephone numbers. It will be understood, however, that the invention can also extend to establishing mapping information for other types of network devices (e.g., Internet-capable telephone devices, etc.) and/or in the context of other types of networks, including, without limitation, wide area networks, metropolitan area networks, local area networks, internets and intranets.

Figure 1:
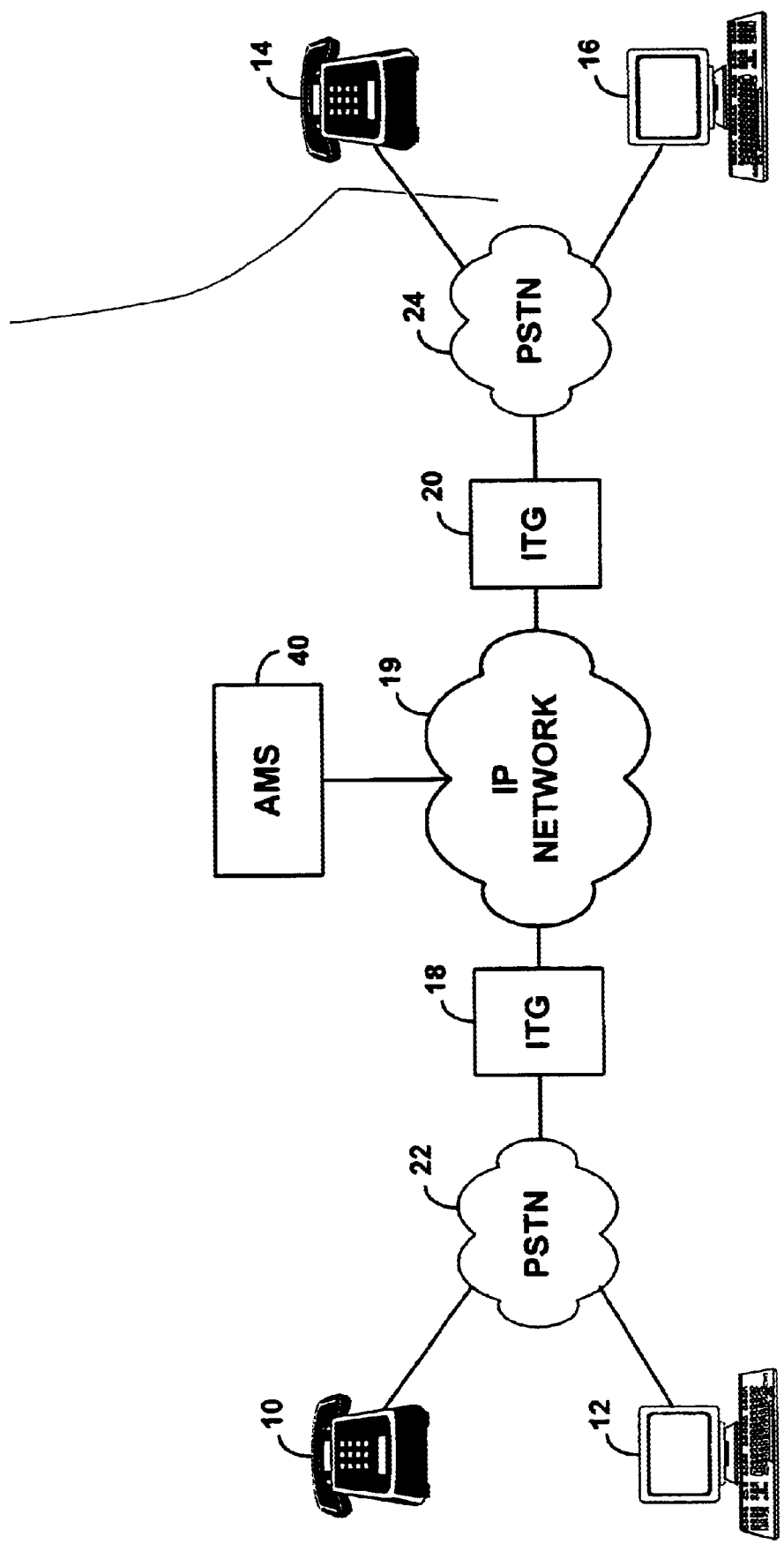
FIG. 1 depicts an IP telephony system in which a preferred embodiment of the present invention may be employed.

Referring to the drawings, FIG. 1 illustrates a basic arrangement of a typical IP telephony system. As noted above, in this arrangement, users at two or more telephone devices (e.g., 10 and 14) are set to engage in a conversation over an IP network 19. Each telephone device (or telephone number) is served by at least one ITG, which provides network connectivity. An AMS 40 on the network in turn provides address mapping information to each originating ITG, to enable the originating ITG to route the call over the IP network to an appropriate terminating ITG.

The telephone numbers served by an ITG may be selected according to any desired criteria but are typically the numbers as to which the ITG can most efficiently provide connectivity. For example, and without limitation, the numbers served by an ITG may be the numbers assigned to telephone devices that are geographically closest to the ITG, so as to minimize the cost of routing calls from the IP network to destination telephone devices.

Alternatively, the numbers served by an ITG may be the numbers assigned by the same telecommunications company that owns and/or operates the ITG (even if the numbers are not necessarily geographically close to the ITG—as for instance with wireless telephone numbers), which may similarly reduce the cost of routing calls from the ITG to those numbers. The set of telephone numbers served by a given ITG may vary over time, for instance, as numbers are added, removed or changed.

Each telephone device may take any of a variety of forms. For instance, without limitation, the telephone device may be a conventional analog or digital telephone (e.g., "black telephone" set) 10 or a personal computer (PC) 12, which may be equipped with a handset (or a microphone and speakers) and telephony software to facilitate a conversation. Therefore, there are presently at least three types of calls that can be made with IP telephony: (i) PC to PC, (ii) PC to telephone, or vice versa, and (iii) telephone to telephone. Of course, IP telephony can also facilitate communication of signals other than voice (e.g., data, video, audio, etc.) as well as communication between other types of devices now known or later developed (e.g., wireless telephones, fax machines, etc.)

The ITG may take any of a variety of forms, and the particular form is not necessarily critical to the present invention. In general, for instance, the ITG may take the form of a network access server (NAS) such as those commercially available from 3Com Corporation and other telecommunications equipment manufacturers such as Ascend Communications, Livingston Enterprises, and Multitech. A representative NAS is the Total Control Enterprise Network Hub from 3Com Corporation, as described in the patent of Dale M. Walsh, et al., U.S. Pat. No. 5,597,595 ("the Walsh patent"), which is fully incorporated herein by reference and to which the reader is directed for additional details. This NAS has a telephone line interface that can be connected to a high-speed multiplexed digital telephone line, such as a T1 line or an ISDN line. The NAS further provides a plurality of digital modems to perform signal conversions (such as sampling, compressing and packetizing) on the data from the telephone line channels and a bus network connecting the modems to a network interface card or module. Examples of such network interface cards are the NetServer™ and EdgeServer™ cards from 3Com Corporation. The network interface card in turn couples the NAS to a local or wide area network, such as the ISP backbone network or the Internet.

Figure 2:
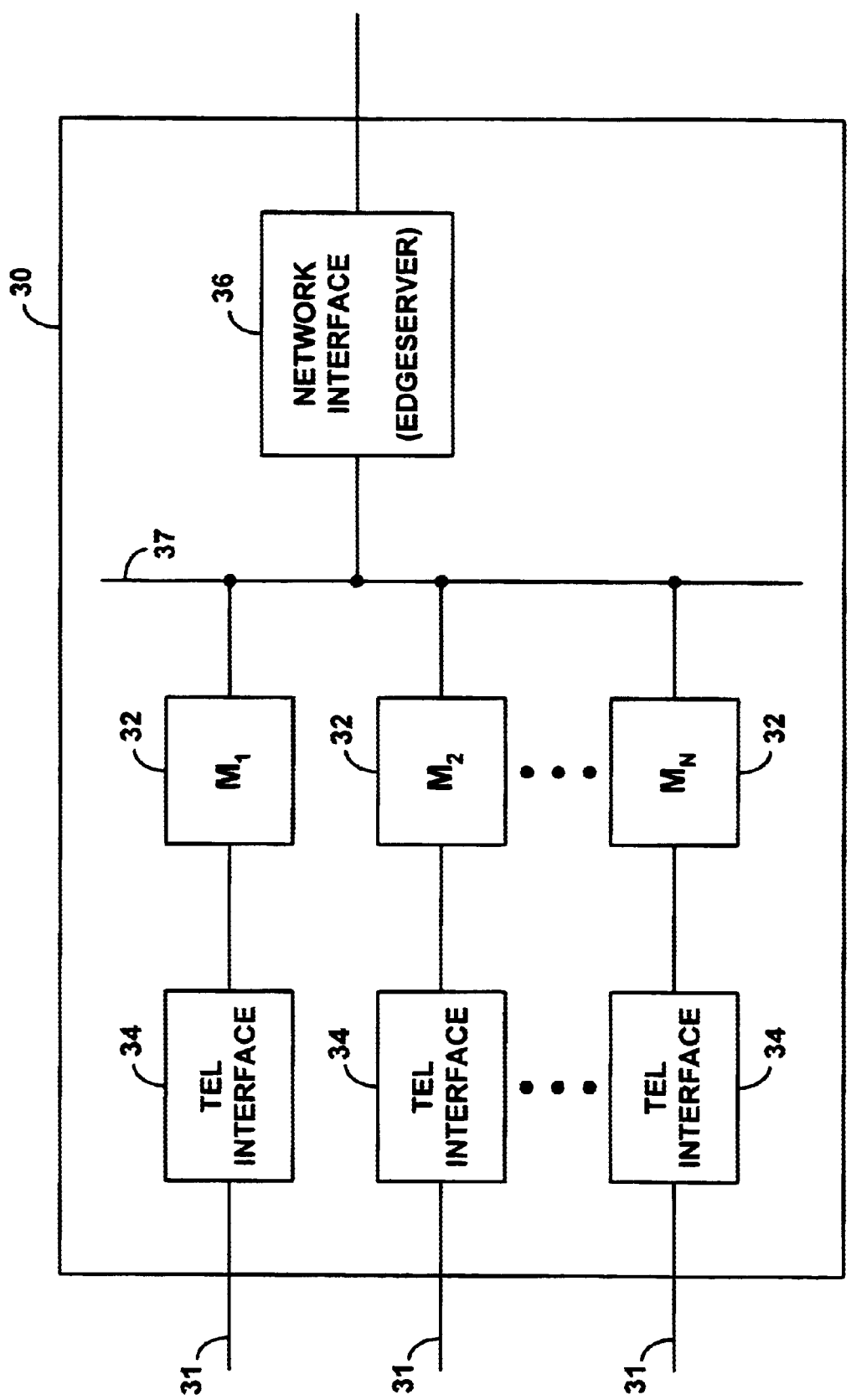
FIG. 2 illustrates a simplified block diagram of an IP telephony gateway suitable for employing the preferred embodiment of the present invention.

Referring more particularly to FIG. 2, there is shown a simplified block diagram of an to exemplary ITG 30 suitable for use in the preferred embodiment. Exemplary ITG 30 includes a plurality of high density modem modules 32, each having (or being coupled with) a telephone line interface 34 for interfacing with the PSTN two-wire analog, T1, E1, T3, E3, ISDN and/or primary rate services. The high density modem modules 32 communicate with a network interface 36 over a packet system bus 37. The high density modem modules, the telephone interfaces and the network interface are preferably on individual printed circuit boards or cards arranged in a chassis. The high density modem modules are "high density" in that each contains a high density digital signal processing (DSP) configuration capable of handling 23, 24 or 30 DS0 channels. An exemplary high density DSP is the HiPer DSP available from 3Com Corporation.

By providing a set of high density modem cards 32 and a robust computing platform in the network interface 36, a single chassis can process many hundreds of calls through the device simultaneously. In this regard, each modem card 32 performs modem functions for a large number of channels on the telephone line. For example, each high density modem card 32 may perform modem functions for 23 B channels plus 1 D channel for an ISDN Primary Rate Interface, 24 DSO channels for a T1 line and 30 channels for an E1 line.

In the exemplary ITG of FIG. 2, each high density modem card 32 has its own telephone line interface 34, connected to an ISDN PRI or T1 line for instance. The telephone line interface 34 is connected to the high density modem cards by a TDM bus 33, as described in the Walsh patent. The telephone line interface 34 is composed of two separate modules (not shown), an incoming call interface module and an incoming call application module. For T1 signals, the interface module physically receives incoming T1 span lines at connection 31, converts the signal in a digital TTL format and delivers the signal to the incoming call application module. The interface module provides a channel switching unit (CSU) interface, which recovers clock signals and data from the incoming T1 signals and also provides the transmission of outgoing digital telephone signals representing digital data to the line at connection 31. The application module provides framing of recovered T1 data to extract the T1 DS0 channel data and then switches the channel data twenty four time slots on a TDM bus 56 to the corresponding high density modem module 32. Of course, the telephone interface may take other forms as well.

The high density modem cards 32 are connected to the network interface card via a high-speed parallel packet bus 37, similar to that described in the Walsh patent. The number of high density modem cards 32 and associated telephone line interface cards 34 is essentially arbitrary, but 10 to 24 such cards are typical in a high density gateway application today, providing modem functionality for between 240 and 576 DS0 channels.

The network interface 36 may be a 3Com EdgeServer™ card or other suitable interface. The EdgeServer™ card consists of a general purpose computing platform (such as an IBM PC) running an operating system such as Windows NT™ from Microsoft Corporation or UNIX. The network interface card 36 contains software and hardware modules to perform call routing, modem configuration and other features as set forth and described for the gateway modules in the Walsh patent as well as in the patent of Baum et al., U.S. Pat. No. 5,577,105, which is also fully incorporated herein by reference. Further details of the design and features of the EdgeServer™ card 36 are set forth in the U.S. patent application of Verthein et al., application Ser. No. 08/813,173, which is fully incorporated herein by reference as well.

Each ITG preferably has a unique IP network address, which designates the location of the ITG in the network and which may change over time. As is well known in the art, IP addresses are presently 32 bits in length and are normally referenced in dotted decimal form, such as 128.127.50.224. A first part of the IP address is a network identifier, which specifies an address that is unique across the IP network for a network or related group of networks. Network identifiers are typically assigned by a central authority. A second part of the IP address is a host identifier, which specifies a particular host, station or node within a given network. The host identifier need only be unique within the given network and may therefore be assigned by a local network administrator.

In networks that are especially designed for internet telephony, there will typically be at least one ITG in each major city. The ITG may be located in any suitable location, such as in a conventional telephone company central office (PSTN central office), in a dedicated internet telephony central office. Similarly, the person or entity that owns and/or operates the ITG (i.e., the internet telephony service provider (ITSP)) may be a PSTN telephone company, a dedicated ISP, or any other suitable entity. In practice, users may then subscribe to the IP telephony service provided by their ITSP(s) and then place and receive calls over the IP network via communications links to their respective gateways.

The communications link between a telephone device and the ITG may also take any suitable form. For instance, if the telephone device is a conventional telephone, the communications link may be the conventional PSTN, with a T1 span extending to the ITG. In that case, a subscriber may place a call to the ITG over the PSTN. As another example, if the telephone device is a PC on a local area network (LAN), the communications link may be, for instance, the LAN and a T1 line and/or the PSTN extending to the ITG. In that case, a subscriber may contact the ITG via the existing network connection. Of course, other suitable communications links are known or will be developed as well.

As noted above, to set up an IP telephony call, an originating gateway 18 needs to understand where in the IP network 19 to address and send digitized voice data. While each network element in an IP network is associated with a unique IP network address, the originating gateway 18 may be provided with only a dialed telephone number, not the IP address of the terminating ITG. Therefore, to properly set up an internet telephony call, the originating gateway needs some mechanism to determine the IP address of the appropriate terminating gateway 20 based on the telephone number supplied by the calling party. In the preferred embodiment, this function is provided by an AMS, which can be made accessible through the IP network or other communications link (e.g., the PSTN).

The AMS may take any of a variety of forms and be in any suitable location (e.g., in one or more discrete nodes on the IP network, or in one or more of the ITGs themselves), and the particular arrangement of the AMS is not necessarily critical to the present invention. In terms of basic hardware and software, the AMS may be similar in configuration to a Domain Naming System (DNS) server, which correlates host names with IP addresses and the arrangement of which is well known. Further, although AMS 40 is shown as a single block coupled with IP network 19 in FIG. 1, those skilled in the art will appreciate that AMS 40 can be distributed throughout the IP network 19. For instance, there could be AMS nodes throughout the United States for handling domestic calls in the United States, and there may be an international AMS node for forwarding international address mapping queries to AMS nodes in other countries.

Figure 3:
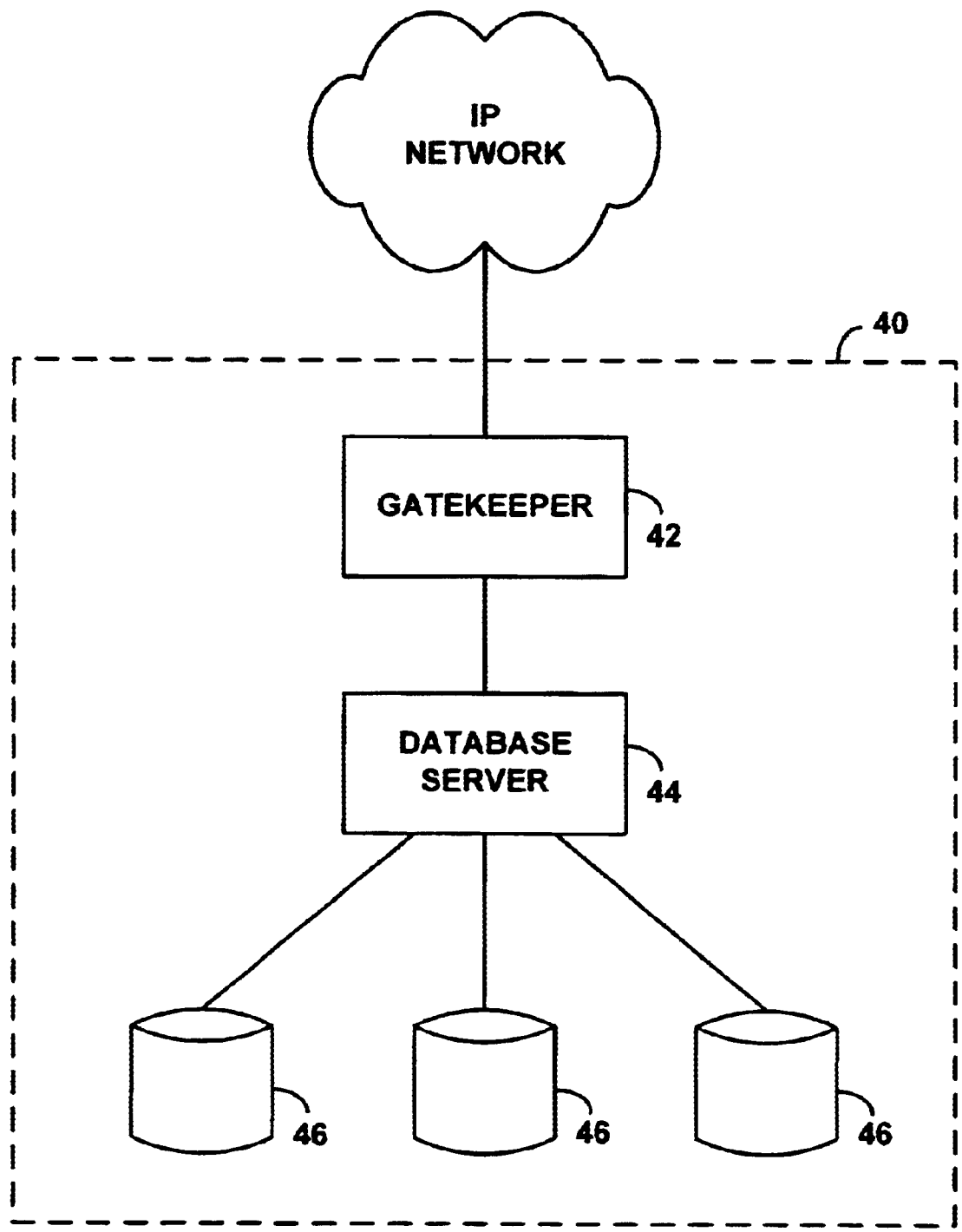
FIG. 3 illustrates a simplified block diagram of an exemplary address mapping system employed in a preferred embodiment of the present invention.

For ease of illustration, FIG. 3 illustrates a simplified block diagram of an exemplary AMS 40. Referring to FIG. 3, AMS 40 is coupled to the IP network through a gatekeeper node 42, which has a known IP address. Although illustrated as part of the AMS 40, the gatekeeper may instead be a separate element that accesses the AMS. The gatekeeper node 42 may be similar in configuration to the network access servers described above or may take any other suitable form. The gatekeeper 42 includes or is coupled with a database management server 44 (preferably through a firewall (not shown)). The database management server 44 in turn includes or is coupled with one or more databases or data files 46. The database management server 44 is configured for database management using a software package such as a database management system (DBMS) and/or structured query language (SQL), and the databases are configured accordingly (e.g., as SQL databases). Exemplary DBMS software packages may be available under the trade names AutoAction (marketed by Platinum Technology of Oakbrook Terrace, Ill.), and Eco Net (marketed by Compuware Corporation of Farmington Hills, Mich.), and exemplary SQL database systems may be available from Gupta, Informix, Microsoft, Powersoft, Oracle and Sybase. One skilled in the art of database programming would be capable of readily constructing the database management server 44 and configuring the databases 46 to provide a usefull AMS for IP telephony.

AMS 40 may maintain address mapping information in any suitable form, and the configuration of the data is not necessarily critical to the present invention. By way of example, AMS 40 may maintain discrete data records that indicate for each known telephone number the IP address to which calls placed to that telephone number should be routed. Alternatively, to conserve storage space, AMS 40 may maintain data records that indicate for each known group of telephone numbers (e.g., for a particular telephone area code (NPA) and prefix (NXX) combination) the IP address to which calls placed to any number in that group should be routed. Each of these records, for instance, may correspond to the central office of a particular ITSP where the ITG is located. In this way, for instance, AMS 40 can translate a telephone number into an appropriate terminating IP address by searching for the data record that defines the IP address associated with the NPA-NXX combination of the dialed telephone number.

AMS 40 preferably receives signaling messages in the form of request packets from the IP network and responds accordingly. These signaling messages may serve any of a variety of purposes. By way of example, and without limitation, the signaling message may be one or more of the following (i) a request to map a telephone number to a specific IP address, (ii) a request to remove the mapping of a telephone number from a specific IP address, and (iii) a request for IP address information corresponding to a dialed telephone number. When a request packet arrives at AMS 40, AMS 40 may update or query the database(s) 46, depending on the type of request. AMS 40 may then respond to the request packet with a suitable response message, such as (i) an acknowledgement ("ACK") that the address mapping database 46 has been updated, (ii) an indication ("NAK") that an error has occurred in updating the database (e.g., an invalid record has been referenced), or (iii) a record indicating an IP address corresponding to the dialed telephone number.

The telecommunication standards governing voice over Internet protocol, such as H.225 (which is part of the H.323 suite of protocols), provide a special message for use by the originating gateway to query the gatekeeper for such terminating address information. This message is referred to as a Location Request (LRQ) message. According to the standards, the originating gateway sends a Registration, Address and Status (RAS) message to a gatekeeper on to determine the network address of the terminating gateway. If the gatekeeper knows the network address of the terminating gateway, the gatekeeper will send a Location Confirm (LCF) message to the originating gateway. If not, the gatekeeper may propagate the LRQ to another gatekeeper to determine the network address of the proper terminating gateway.

As currently envisioned, to make an IP telephony call, the following events may occur. Referring again to FIG. 1, a calling party (e.g., at telephone 10) first places a call over a local communications link (e.g., PSTN 22) to the party's ISP, by dialing a number associated with the ISP's internet telephony gateway 18. This gateway may be referred to as the originating gateway or originating ITG. Once the caller is connected with the originating gateway 18, the caller may supply the gateway with the telephone number of the desired call recipient and, perhaps, a personal identification number (PIN) or access code to establish the caller's authorization and account. The caller may supply this information in any suitable fashion, including, for instance, with voice or DTMF signaling. Further, those skilled in the art will appreciate that the originating gateway may supply some interactive voice response messages arranged to prompt the caller for these numbers and/or other information.

In an alternative configuration, it is possible that an ITSP may offer direct dialing services to customers. In this configuration, for instance, a caller's telephone device(s) may be coupled directly to a local ITG, similarly to how telephones are currently coupled directly to PSTN central offices in circuit switched telephone systems. Callers may then be able to directly dial a called party without having to first call an ITG and then input the desired number.

Once the originating gateway 18 has the IP address of the terminating gateway 20 that serves the dialed number, the two gateways may negotiate mutually acceptable communication parameters (e.g., coding standards, etc.) The terminating gateway may then place a call over a communication link (e.g., PSTN 24) to the called party telephone device 14 in an effort to establish a telephone communication path with the called party. If the called party answers, then the originating and terminating gateways 18, 20 may begin transmitting and receiving packet streams representing the interactive digitized voice signals of the caller and called parties. Finally, where digital signals are conveyed in the PSTNs, the respective PSTNs may convert the transmitted and received digital data signals back to audio for each respective party to understand.

Those of ordinary skill in the telecommunications art will appreciate that the foregoing serves only as an example of an IP telephony system and of call placement via IP telephony. Other network configurations and signaling procedures are possible. For instance, in another arrangement, rather than having the initiating gateway query a gatekeeper or AMS for address mapping information, the initiating gateway may instead forward the whole call request to a gatekeeper, and the gatekeeper may in turn identify the IP address of a terminating gateway (e.g., by reference to an internal data source or by querying another AMS) and itself connect the call to that terminating gateway.

The present invention provides a mechanism for supplying an AMS with data that can facilitate mapping telephone numbers to the IP addresses of ITGs that serve those numbers. According to the preferred embodiment, an ITG is configured to automatically provide mapping indicia about itself to the AMS. This ITG may be referred to as a self-registering ITG to ("SRITG"). Alternatively, it will be appreciated that an adjunct device or process may be provided for conveying mapping indicia about the SRITG to the AMS. The adjunct device or process may co-located and coupled with the SRITG or may be located at some other location, provided it possesses the necessary information about the SRITG and is arranged to convey the information to the AMS. For ease of illustration, and without limitation, this description will assume that the SRITG itself conveys its mapping indicia to the AMS.

The mapping indicia conveyed by the SRITG preferably defines (expressly and/or by reference) address mapping information about the SRITG, such as the network address of the SRITG and telephone numbers served by the SRITG. According to the preferred embodiment, the mapping indicia can include network address indicia and/or phone number indicia. As will be described more below, the network address indicia preferably serves to indicate the IP network address of the SRITG, and the phone number indicia preferably serves to indicate one or more telephone numbers served by the SRITG at that network address. The mapping indicia may take any of a variety of forms and may be communicated from the SRITG to the AMS in any number of ways and at one or more times. Further, it will be appreciated that the form of the mapping indicia may depend on the manner and medium by which the mapping indicia is conveyed from the SRITG to the AMS, and vice versa.

In the preferred embodiment, the SRITG is arranged to automatically convey its mapping indicia to the AMS in response to the occurrence of a predetermined event. The predetermined event may be the initialization (e.g., installation and powering-up, or resetting) of the SRITG. Alternatively, the predetermined event may be a change in the IP address of the SRITG or in the set of telephone numbers served by the SRITG. Still alternatively, the predetermined event may be the passage of some time, as for instance if the SRITG is configured to routinely convey mapping indicia to the AMS at regular time intervals. Yet alternatively, the predetermined event may be manual instruction, as for instance when an operator at a workstation manually instructs the SRITG (e.g., via keyboard entry) to convey its mapping indicia to the AMS. Of course, the predetermined event may take other forms as well, consistent with the desire to provide the AMS with current address mapping information about the SRITG.

The SRITG is preferably programmed with software or firmware to cause the SRITG to automatically convey its mapping indicia to the AMS. These programs can take any suitable form and be located in any suitable location. In this regard, for instance, the EdgeServer™ card in the SRITG and/or a modem module in the SRITG can be programmed with a set of machine language instructions (e.g., stored on an EEPROM, in memory, or in another storage medium in the SRITG), to cause the SRITG to automatically convey its mapping indicia at a specified time. The processor embodied in the EdgeServer™ card or in a HiPer DSP modem module may then provide the desired mapping indicia to an interface for transmission of the indicia to the AMS. In addition, various aspects of the SRITG's mapping indicia (e.g., the SRITG's IP address and/or telephone number) may be conveniently maintained in a storage medium in the SRITG for use in establishing and conveying the desired mapping indicia to the AMS.

As presently contemplated, the network address indicia may expressly include the IP address of the SRITG. The IP address can be set forth in dotted decimal form as described above, or in any other suitable form.

Alternatively, rather than expressly setting forth the IP address of the SRITG, the network address indicia may include a reference to the IP address of the SRITG, which will allow the AMS to determine the IP address of the SRITG. For this purposes, any suitable reference may be used. As an example, without limitation, the network address indicia may be the Internet domain name of the owner and/or operator of the SRITG. For instance, if the SRITG is located at a telephone company central office or at an Internet telephony service provider (ITSP) office, the network address indicia may provide the Internet domain name of the respective telephone company or ITSP. Upon receipt of such network address indicia, the AMS or other element may then conveniently refer to an appropriate reference database to determine the IP address of the SRITG based on the domain name of SRITG's owner or operator. One such appropriate reference database, for example, is a DNS server, which is well known in the art for use in correlating host computer names with numerical IP addresses.

Similarly, as presently contemplated, the phone number indicia may expressly include one or more telephone numbers served by the SRITG. These telephone number(s) may be set forth in whole (e.g., as full 10 digit numbers, in the United States). Alternatively, to avoid excessive data transmissions, the telephone numbers may be set forth as groups of numbers (e.g., NPA-NXX combinations).

Still alternatively, rather than expressly setting forth the telephone numbers served by the SRITG, the phone number indicia may include a reference to the telephone numbers served by the SRITG. Like the network address indicia, any of a variety of suitable references may be used for this purpose. By way of example, the phone number indicia may include a telephone number ("gateway telephone number") defined by the SRITG, such as the phone number of the SRITG itself or the phone number of the office where the SRITG is located, either of which can preferably be recorded or programmed into the SRITG, for subsequent reference by the SRITG.

Upon receipt of this phone number indicia, the AMS or other element may then conveniently refer to a telephone number mapping database to identify other telephone numbers located geographically close to the SRITG. For instance, if the phone number of the SRITG or of its central office has a given NPA-NXX combination, a reference database may indicate to the AMS that the SRITG is geographically close to telephone numbers with that and several other NPA-NXX combinations.

Alternatively, the AMS or other element may establish or determine other relationships between the SRITG and telephone numbers. For instance, if the SRITG serves wireless (e.g., cellular, PCS, etc.) customers, then the AMS may refer to an appropriate reference database to associate the IP address of the SRITG with the wireless phone numbers that the SRITG serves. By way of example, if the SRITG is owned and operated by a PSTN local exchange carrier (LEC) and/or situated in a LEC central office, then a reference database may indicate to the AMS what wireless phone numbers are served by that LEC. Alternatively, if the SRITG is owned and operated by a wireless phone company, then a reference database may indicate to the AMS what wireless numbers are served by the wireless phone company.

As another example, the phone number indicia may set forth the specific geographic position of the SRITG. In this regard, the SRITG may determine its specific geographic coordinates by referring to readily available Global Positioning System ("GPS") information. As known by those skilled in the art, GPS is a satellite navigation system controlled by the United States Department of Defense, which provides a User Segment that enables a user with a GPS receiver to identify fairly precisely the geographic position of the receiver. The SRITG may be programmed or provided with its GPS coordinates and/or may include or be coupled with a GPS receiver to identify its coordinates. Upon receipt of phone number indicia including the geographic position coordinates of the SRITG, the AMS may refer to a geographic telephone number mapping database in order to identify the telephone numbers that are located geographically close to the SRITG.

As yet another example, if a reference database exists or is provided to identify telephone numbers served by an SRITG by reference to the IP address or other network address indicia of the SRITG, then the network address indicia of the SRITG may itself serve as the phone number indicia of the SRITG. Upon receipt of the network address indicia of the SRITG, the AMS may consult the reference database to identify the telephone numbers served by the SRITG and may then update its address mapping database(s) accordingly.

According to a preferred embodiment, the SRITG may automatically convey its mapping indicia to the AMS in any suitable fashion. By way of example, if the SRITG and AMS are both interconnected to the IP network, then the SRITG may convey its mapping indicia to the AMS as digitized TCP/IP packet streams over the IP network. As described above, these packets may take the form of request packets, by which the SRITG directs the AMS to add or delete an address mapping record from the address mapping database. Conveniently, the SRITG may not need to expressly set forth its IP address as payload in these packets, if its IP address is already conveyed as the source address in the IP packet(s) (in an IP header, for instance). In that case, the packet header should preferably identify the packet as address registration information. The AMS may thus obtain the IP address of the SRITG from the source address in the IP packet(s), correlate the IP address with the phone number indicia conveyed by the SRITG, and update its address mapping database(s) accordingly.

As another example, if the SRITG and AMS are each interconnected to the PSTN and equipped with modem, for instance, then the SRITG may place a conventional modem-to-modem call to the AMS via the PSTN convey at least some of its mapping indicia to the AMS as a data transfer via the modem connection. The mapping indicia may, for instance, include both network address indicia and phone number indicia.

Alternatively, according to another convenient aspect of the preferred embodiment, the SRITG may use automatic calling number delivery (or "caller ID") procedures to convey its telephone number to the AMS. For example, if the SRITG places a modem-to-modem call to the AMS, the AMS may receive the telephone number of the SRITG through automatic calling number delivery before the AMS modem answers the call. (Although the SRITG does not itself actively convey this information, the SRITG should be understood to be passively conveying this information through the caller ID process). The AMS modem may then answer the call and establish modulated communication with the SRITG modem, and the SRITG may convey its network address indicia as data over the PSTN modem connection. Upon receipt, the AMS may then correlate the telephone number with the address indicia and update its address mapping database(s) accordingly. This mechanism will work particularly well if the SRITG does not know its own phone number or the phone number of the office where it is located, since the SRITG does not need to know this information in order to convey the information to the AMS through use of caller ID.

Figure 4:
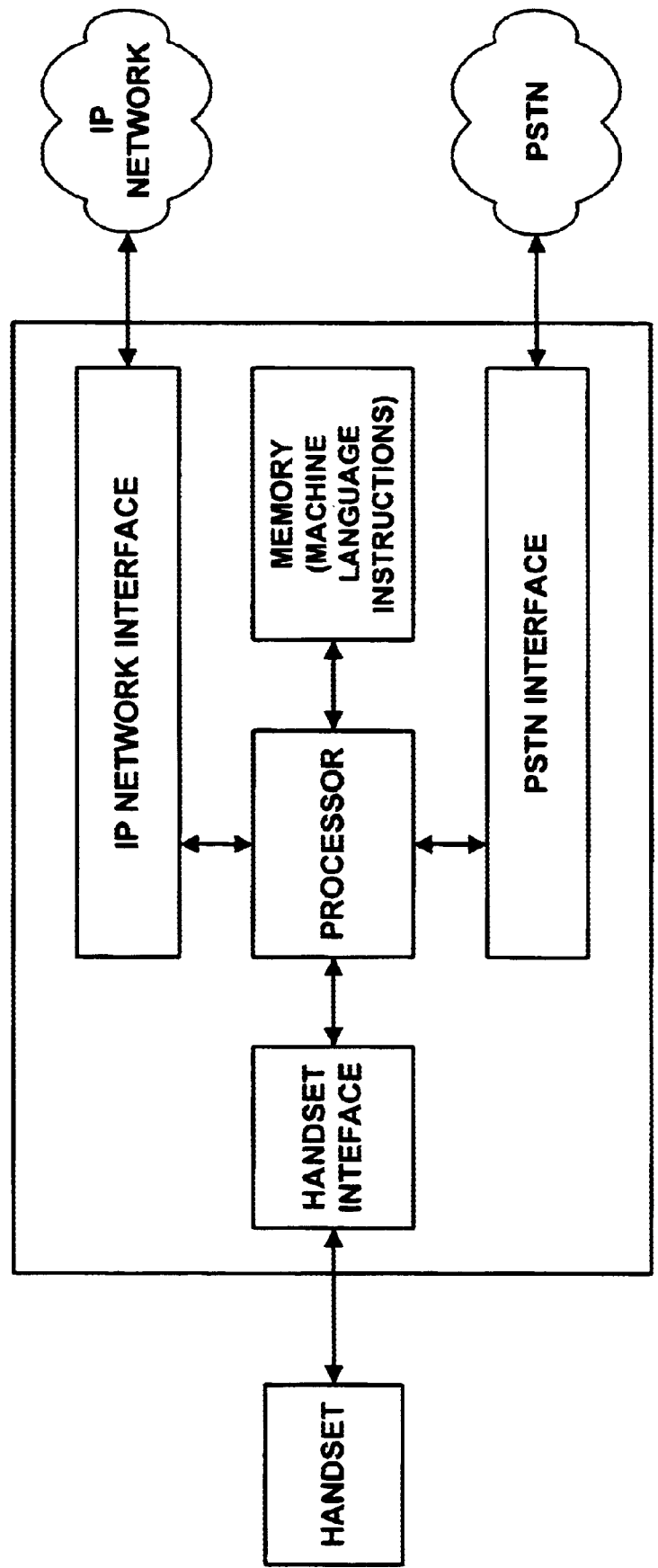
FIG. 4 illustrates a simplified block diagram of an internet telephone that may employ the present invention.

According to an alternative embodiment, the present invention can also be employed to establish address mapping information for an internet telephony device such as an internet telephone. As presently contemplated, an internet telephone is a telephone that is generally configured to enable direct telephone communications over an internet. The internet telephone may include a conventional telephone handset and is preferably equipped with a processor and a stored set of machine language instructions for digitizing and packetizing outgoing speech signals and vice versa for incoming speech signals. Additionally, the internet telephone may be equipped with a network interface for transmitting and receiving packetized streams between the internet and the processor and perhaps a telephone interface for placing and receiving calls over the PSTN. FIG. 4 illustrates a simplified block diagram of one such internet telephone by way of example.

Like a conventional telephone, the internet telephone device should preferably be assigned its own "PSTN" telephone number for placing and receiving calls. Additionally, like a conventional IP network node, the internet telephone should be assigned a unique IP network address, which uniquely defines the location of the internet telephone in the network and facilitates IP transmissions to and from the internet telephone. Similar to an ITG, some mechanism must be in place to map the dialed telephone number of the internet telephone to the IP address of the internet telephone.

In accordance with this alternative embodiment, the internet telephone device can be configured to automatically convey its mapping indicia to the AMS, similar to the mechanism described above with respect to the SRITG. In this regard, like the preferred SRITG, the preferred self registering internet telephone device may be programmed with a set of machine language instructions executed by its processor for providing mapping indicia to an interface circuit and causing the interface circuit to transmit the mapping indicia to the AMS.

The present invention thus provides a convenient mechanism for establishing and to updating address mapping information in an IP telephony system. With the benefit of the above description, those of ordinary skill in the art should understand that various individual elements of the invention can be replaced with suitable alternatives and equivalents. It will thus be understood that changes and modifications may be made to the invention without deviating from the spirit and scope of the invention as claimed.

We claim:

1. A self-registering telephony gateway for use in a packet switched network, said self-registering telephony gateway comprising, in combination:

a processor;

a storage medium;

a network interface circuit coupling said telephony gateway with a network, said network interface circuit receiving incoming signals from said network and transmitting outgoing signals to said network;

a telephone interface for communicating with subscriber telephone devices having subscriber telephone numbers, whereby the telephony gateway interfaces communications between the one or more subscriber telephone devices and the network; and a set of machine language instructions stored in said storage medium and executable by said processor to cause said telephony gateway to automatically communicate, to an address mapping system in said network, mapping information that enables the address mapping system to correlate (i) an address of the telephony gateway in the network with (ii) one or more subscriber telephone numbers served by the telephony gateway, the mapping information including (i) address indicia, indicative of the address of the telephony gateway and (ii) telephone number indicia, indicative of one or more subscriber telephone numbers served by the telephony gateway.

2. A self-registering telephony gateway as claimed in claim 1, wherein said telephony gateway defines a network address, and said address indicia comprises said network address.

3. A self-registering telephony gateway as claimed in claim 1, wherein said telephony gateway defines a network address, and said address indicia comprises a reference to said network address.

4. A self-registering telephony gateway as claimed in claim 1, wherein said telephony gateway defines an IP address, said telephony gateway is operated by a company having a network domain name, and said address indicia comprises said network domain name.

5. A self-registering telephony gateway as claimed in claim 1, wherein said phone number indicia comprises at least one of said subscriber telephone numbers.

6. A self-registering telephony gateway as claimed in claim 1, wherein said telephony gateway defines a telephone number, and said phone number indicia comprises said telephone number.

7. A self-registering telephony gateway as claimed in claim 6, wherein said telephony gateway communicates said mapping indicia to said address mapping system by placing a call to said address mapping system over a public switched telephone network, said telephone number thereby being conveyed to said address mapping system trough automatic calling number delivery.

8. A self-registering telephony gateway as claimed in claim 1, wherein said telephony gateway defines a geographic position, and said phone number indicia comprises an indication of said geographic position.

9. A self-registering telephony gateway as claimed in claim 8, wherein said telephony gateway identifies said geographic position at least in part by referencing a global positioning system.

10. A self-registering telephony gateway as claimed in claim 1, wherein said telephony gateway communicates said mapping indicia to said address mapping system via a communications link comprising an IP network.

11. A self-registering telephony gateway as claimed in claim 1, wherein said telephony gateway communicates said mapping indicia to said address mapping system via a communications link comprising a PSTN network.

12. A self-registering telephony gateway as claimed in claim 1, wherein said telephony gateway communicates said mapping indicia to said address mapping system in response to a predetermined event.

13. A self-registering telephony gateway as claimed in claim 1, wherein said telephony gateway communicates said mapping indicia to said address mapping system in response to said telephony gateway being initialized.

14. A self-registering telephony gateway as claimed in claim 1, wherein said telephony gateway provides network connectivity for a plurality of telephone numbers, and said telephony gateway communicates said mapping indicia to said address mapping system in response to a change in said telephone numbers.

15. In a computer network of the type including (i) a plurality of telephony gateways, each telephony gateway defining a network address and providing network connectivity for a plurality of telephone numbers of subscriber telephone devices and (ii) an address mapping system maintaining a data source that comprises mapping information correlating telephone numbers with network addresses of the telephony gateways that provide network connectivity for said telephone numbers, a method for populating said data source with said mapping information for a given telephony gateway, said method comprising, in combination;

said given telephony gateway automatically communicating mapping indicia to said address mapping system, said mapping indicia comprising address indicia and phone number indicia associated with said given telephony gateway, said address indicia being indicative of the address of said telephony gateway, and said phone number indicia being indicative of one or more of said telephone numbers of subscriber telephone devices for which said gateway provides network connectivity; and said address mapping system receiving said mapping indicia and, based at least in part on said mapping indicia, responsively updating said data source with mapping information for correlating said address of said given telephony gateway with said one or more telephone numbers of said subscriber telephone devices.

16. A method as claimed in claim 15, wherein said computer network comprises an IP network, and said network address comprises an IP address.

17. A method as claimed in claim 15, wherein:

said computer network comprises an IP network;

said network address of said given telephony gateway comprises an IP address;

said given telephony gateway is operated by a company associated with an internet domain name; and said address indicia comprises an indication of said internet domain name, whereby said address mapping system may translate said internet domain name into said IP address at least in part by reference to a domain naming system.

18. A method as claimed in claim 15, wherein said address indicia comprises the network address of said given telephony gateway.

19. A method as claimed in claim 15, wherein said address indicia comprises a reference to the network address of said give telephony gateway.

20. A method as claimed in claim 15, wherein said phone number indicia comprises one or more of the telephone numbers for which said given telephony gateway provides network connectivity.

21. In a computer network of the type including (i) a plurality of telephony gateways, each telephony gateway defining a network address and providing network connectivity for a plurality of telephone number and (ii) all address mapping system maintaining a data source that comprises mapping information correlating telephone numbers with network addresses of the telephony gateways that provide network connectivity for said telephone numbers, a method for populating said data source with said mapping information for a given telephony gateway, said method comprising, in combination:

said given telephony gateway automatically communicating mapping indicia to said address mapping system, said mapping indicia comprising address indicia and phone number indicia associated with said given telephony gateway; and said address mapping system receiving said mapping indicia and, based at least in part on said mapping indicia, responsively updating said data source with mapping information for said given telephony gateway, wherein said telephony gateway defines a gateway telephone number, and said phone number indicia comprises said gateway telephone number, whereby said address mapping system may refer to a geographic telephone number mapping database to translate said gateway telephone number into the telephone numbers as to which said given telephony gateway provides connectivity.

22. A method as claimed in claim 21, wherein:

said given telephony gateway communicates said gateway telephone number to said address mapping system at least in part by placing a telephone call to said address mapping system over a public switched telephone network, said telephone number thereby being conveyed to said address mapping system through automatic calling number delivery.

23. A method as claimed in claim 22, wherein said telephone call is a modem-to-modem call and said given telephony gateway conveys said address indicia to said address mapping system at least in part as modulated data in said modem-to-modem call.

24. In a computer network of the type including (i) a plurality of telephony gateways, each telephony gateway defining a network address and providing network connectivity for a plurality of telephone number and (ii) an address mapping system maintaining a data source that comprises mapping information correlating telephone numbers with network addresses of the telephony gateways that provide network connectivity for said telephone numbers, a method for populating said data source with said mapping information for a given telephony gateway, said method comprising, in combination:

said given telephony gateway automatically communicating mapping indicia to said address mapping system, said mapping indicia comprising address indicia and phone number indicia associated with said given telephony gateway; and said address mapping system receiving said mapping indicia and, based at least in part on said mapping indicia, responsively updating said data source with mapping information for said given telephony gateway, wherein said given telephony gateway defines a geographic position and said phone number indicia comprises indicia of said geographic position, whereby, based on said indicia of said geographic position, said address mapping system may refer to a telephone number mapping database in order to identify one or more telephone numbers geographically close to said telephony gateway.

25. A method as claimed in claim 24, wherein said given telephony gateway defines a gateway telephone number, and said indicia of said geographic position comprises at least part of said gateway telephone number.

26. A method as claimed in claim 25, wherein said at least part of said gateway telephone number comprises NPA-NXX information.

27. A method as claimed in claim 25, wherein said at least part of said gateway telephone number comprises said gateway telephone number.

28. A method as claimed in claim 24, wherein said indicia of said geographic position comprises the geographic position.

29. A method as claimed in claim 28, wherein said given telephony gateway determines said geographic position at least in part by referring to a global positioning system.

30. A method as claimed in claim 15, wherein said given telephony gateway communicates said mapping indicia to said address mapping system via a communications link comprising an IP network.

31. A method as claimed in claim 15, wherein said given telephony gateway communicates said mapping indicia to said address mapping system via a communications link comprising public switched telephone network.

32. A method as claimed in claim 15, wherein said given telephony gateway communicates said mapping indicia to said address mapping system in response to a predetermined event.

33. A method as claimed in claim 15, wherein said given telephony gateway communicates said mapping indicia to said address mapping system in response to said given telephony gateway being initialized.

34. A method as claimed in claim 15, wherein said given telephony gateway communicates said mapping indicia to said address mapping system in response to a change in the telephone numbers for which said giver telephony gateway provides network connectivity.

* * * * *